United States Patent [19]
Gleckman

[11] Patent Number: 5,645,337
[45] Date of Patent: Jul. 8, 1997

[54] APERTURED FLUORESCENT ILLUMINATION DEVICE FOR BACKLIGHTING AN IMAGE PLANE

[75] Inventor: Philip Gleckman, Wilsonville, Oreg.

[73] Assignee: Interstate Electronics Corporation, Anaheim, Calif.

[21] Appl. No.: 557,692

[22] Filed: Nov. 13, 1995

[51] Int. Cl.[6] .................................................. G01D 11/28
[52] U.S. Cl. ........................ 362/29; 313/113; 313/488; 362/224; 362/225; 362/243; 362/245; 362/255; 362/260; 362/308
[58] Field of Search ............................... 313/113, 488; 359/49, 50; 362/29–31, 223, 224, 225, 255, 256, 241, 244–247, 305, 308, 260

[56] References Cited

U.S. PATENT DOCUMENTS

| | | | |
|---|---|---|---|
| 3,047,763 | 7/1962 | Inman | 313/493 |
| 3,258,630 | 6/1966 | Scott | 313/493 |
| 3,457,447 | 7/1969 | Menelly et al. | 313/488 |
| 3,508,103 | 4/1970 | Young | 313/493 |
| 3,767,956 | 10/1973 | Bauer | 313/113 |
| 4,266,167 | 5/1981 | Proud et al. | 315/248 |
| 4,330,813 | 5/1982 | Deutsch | 362/244 |
| 4,345,308 | 8/1982 | Mouyard et al. | 362/245 |
| 4,743,799 | 5/1988 | Loy | 313/493 |
| 4,767,965 | 8/1988 | Yamano et al. | 313/491 |
| 4,851,734 | 7/1989 | Hamal et al. | 313/485 |
| 4,915,479 | 4/1990 | Clarke | 359/49 |
| 4,920,298 | 4/1990 | Hinotani et al. | 313/493 |
| 5,055,978 | 10/1991 | Rogoff | 362/31 |
| 5,202,950 | 4/1993 | Arego et al. | 385/146 |

FOREIGN PATENT DOCUMENTS

| 155829 | 9/1984 | Japan | 359/50 |
|---|---|---|---|

OTHER PUBLICATIONS

"Fluorescent backlights for LCDs" by Mercer, et al., *Information Display*, Nov. 1989, pp. 8–13.
"Flat Fluorescent Lamp for LCD Back–Light", by Hinotani, et al., Jan. 1988 International Display Research Conference (4 pages).

*Primary Examiner*—Alan Cariaso
*Attorney, Agent, or Firm*—Calfee, Halter & Griswold

[57] ABSTRACT

A backlighting unit for illuminating a planar display is provided, comprising an illumination source having a light emitting portion for emitting illumination toward the generally planar display, and a reflector for collecting the emitted illumination and reflecting the collected illumination toward the planar display, the reflector being positioned intermediate the illumination source and the display. The illumination source is a fluorescent lamp having an interior surface thereof substantially coated with a phosphor, and the light emitting portion is an aperture in the fluorescent lamp wherein no phosphor coating is present. The fluorescent lamp may be provided with a reflective wrap for increasing its illumination gain. A lens positioned between the reflector and the display receives the illumination reflected by the reflector and redirects the received illumination toward the display to provide even backlit illumination thereof.

23 Claims, 7 Drawing Sheets

APERTURED FLUORESCENT ILLUMINATION DEVICE FOR BACKLIGHTING AN IMAGE PLANE

FIELD OF THE INVENTION

The present invention relates generally to fluorescent illumination devices and more particularly to an apertured fluorescent illumination system for providing high brightness, even backlighting for an image plane such as a planar liquid crystal display.

BACKGROUND OF THE INVENTION

Liquid crystal displays are used in a variety of electronic applications, including portable computers, flat screen televisions, and vehicular and aircraft instrumentation. Most liquid crystal displays require an illumination source for backlighting the display, located on the side of the display opposite a viewer, in order to effectively communicate the information on the display to the viewer.

Of concern to the liquid crystal display backlighting designer are the efficiency and brightness of the illumination source/liquid crystal display system. Accordingly, the liquid crystal display backlighting designer must arrive at the best compromise of brightness and efficiency for a backlighting system for a liquid crystal display. Of course, size and cost limitations are also of concern to the designer.

Backlighting systems for liquid crystal displays typically take one of two forms, as shown in prior art FIGS. 1 and 2. A first prior art design 10 is shown in FIG. 1. A pair of fluorescent lamps 12 and 14 shine through a light-blocking layer 15 and a diffuser 16 to illuminate a liquid crystal display 17. The light-blocking layer 15 and the diffuser 16 diffuse the light output by the lamps 12 and 14 to provide a more even distribution of illumination across the display 17. A reflector 18 having a reflective surface facing the lamps 12 and 14 redirects light emitted by the lamps, in directions other than toward the display, to improve system brightness and efficiency.

A disadvantage of prior art backlighting systems such as that shown in FIG. 1, however, is their overall thickness. Therefore, the system of FIG. 1 is inappropriate for use in compact environments. Also, because the light sources 12 and 14 in the system 10 are disposed directly behind the liquid crystal display, opposite the side of the display facing an observer, the light blocking layer 15 and the diffuser 16 must provide sufficient diffusion to eliminate hot-spots which would otherwise appear on the portions of the display directly in front of the lamps. The diffusion provided by these elements generally reduces the light transmission by approximately 20% to 50%, which adversely impacts the overall efficiency of the prior art system of FIG. 1, and significantly lowers the brightness of the backlight from the wall brightness of the fluorescent lamps.

A second type of prior art backlighting system 20 is shown in FIG. 2. The system 20 includes one or more light sources 22, 23, which illuminate the edge or edges of a light pipe 24. The light sources may be, for example, fluorescent lamps having light emitting apertures 25 located on the portion of the lamp facing the light pipe 24. The light pipe 24 provides illumination for a liquid crystal display 26, in effect, by redirecting light emitted by the fluorescent lamps 90° toward the display. An index-matching material 27 may be provided between the light pipe 24 and the display 26. A reflector 28 may also be provided for directing light toward the display 26.

Backlighting a liquid crystal device by means of edge lighting a light pipe as in FIG. 2 generally eliminates the dimensional (thickness) problems associated with the direct backlighting system of FIG. 1. However, because the light which enters the narrow edge or edges of the light pipe must be spread uniformly over its length, edge lighting systems 20 such as that shown in FIG. 2 cannot provide the brightness that direct backlighting systems provide. Sufficient brightness is especially important in applications such as aircraft instrumentation panels which often need to be viewed in the presence of bright sunlight.

It is therefore an object of the present invention to provide a direct backlighting, high brightness, high efficiency device for illuminating an image plane such as a planar liquid crystal display, which includes an apertured fluorescent high brightness light source and a reflector for evenly distributing light exiting the aperture across a finite image plane. It is a further object of the present invention to provide such an illumination device having a low profile for use in confined-area applications. It is yet a further object of the present invention to provide an illumination system which may be constructed from a plurality of such devices to accommodate a variety of sizes of planar displays.

SUMMARY OF THE INVENTION

A backlighting system for illuminating a planar display is provided which may be constructed from identical modular backlighting units to create a system for backlighting planar displays, such as LCDs, of various sizes. Each of the backlighting units provides even illumination for a pre-defined portion of the display. The backlighting units each provide illumination on the order of 500 footlamberts on the side of the LCD facing a viewer.

The individual backlighting units each comprise a tubular fluorescent lamp, a reflector, and a lens, the entire unit having a total depth of less than one inch. The fluorescent lamp comprises a glass tube which is internally coated with a phosphor about its inner surface. An aperture extends the length of the tube. The size of the aperture is defined by an angle of about 60° as measured from a central longitudinal axis of the tube. The aperture permits light to be emitted by the lamp.

In order to provide a brightness gain for the fluorescent lamp, a diffuse or specular reflecting layer, or both, either on the inner or outer glass surface, may be provided. If provided on the inner surface of the glass, the phosphor coating is applied thereover. Thus, the reflecting layer or layers trap light emitted by the phosphor so that the emitted light may only escape the tube through the aperture (where there is an absence of reflective material), thereby providing a brightness gain.

The reflector collimates the light emitted by the aperture. The lens redirects (bends) the collimated light toward the viewer. The shape of the interior walls of the reflector determines the distribution of the illumination across a rear surface of the lens, and the shape of the lens determines the direction in which the light is aimed toward the viewer.

In addition to further improving the uniformity of illumination impinging upon its rear surface to produce the desired even illumination of the display, the reflector operates to control the viewing angle, in one of two planar dimensions, over which the illumination passing through the display is emitted toward a viewer of the display. A viewer typically views the display along an axis which lies generally perpendicular to the plane of the planar display. The viewing angle is defined as the angle, bisected by this axis, over which light is directed toward the viewer.

DETAILED DESCRIPTION OF THE PREFERRED EMBODIMENT

Figure 1:
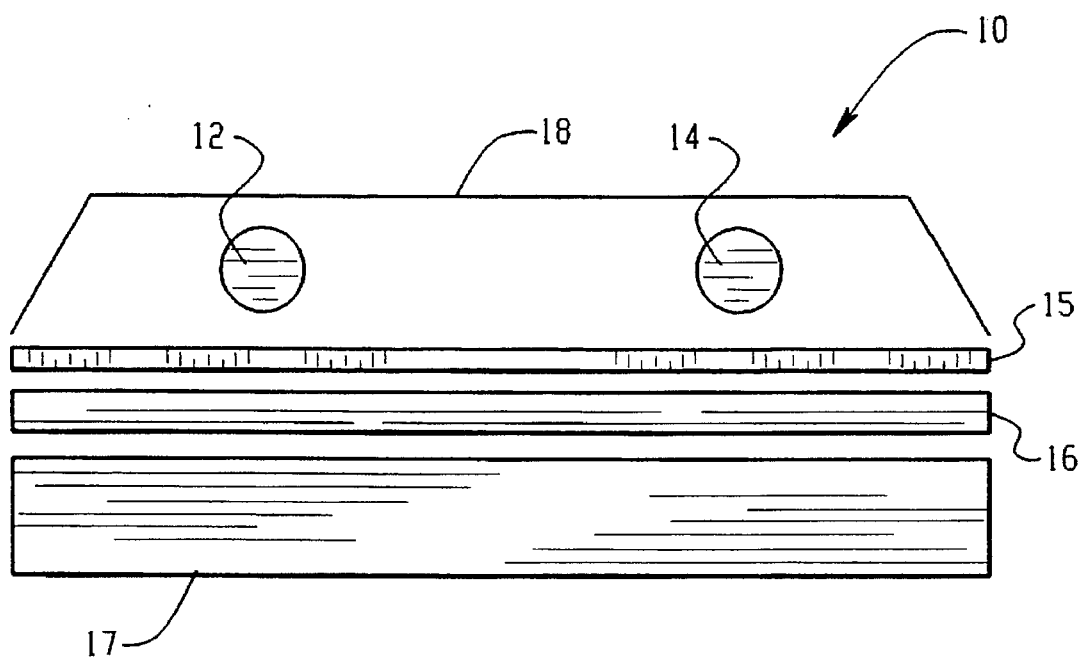
FIG. 1 is a perspective view of a prior art direct backlighting system for providing illumination for an image plane.
Figure 2:
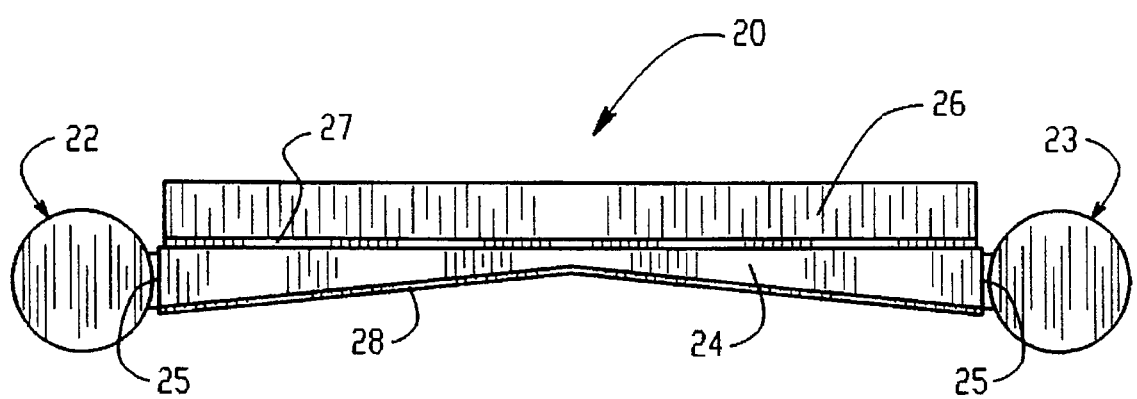
FIG. 2 is an end sectional view of a prior art indirect edge-lighting system for providing illumination for an image plane.
Figure 3A:
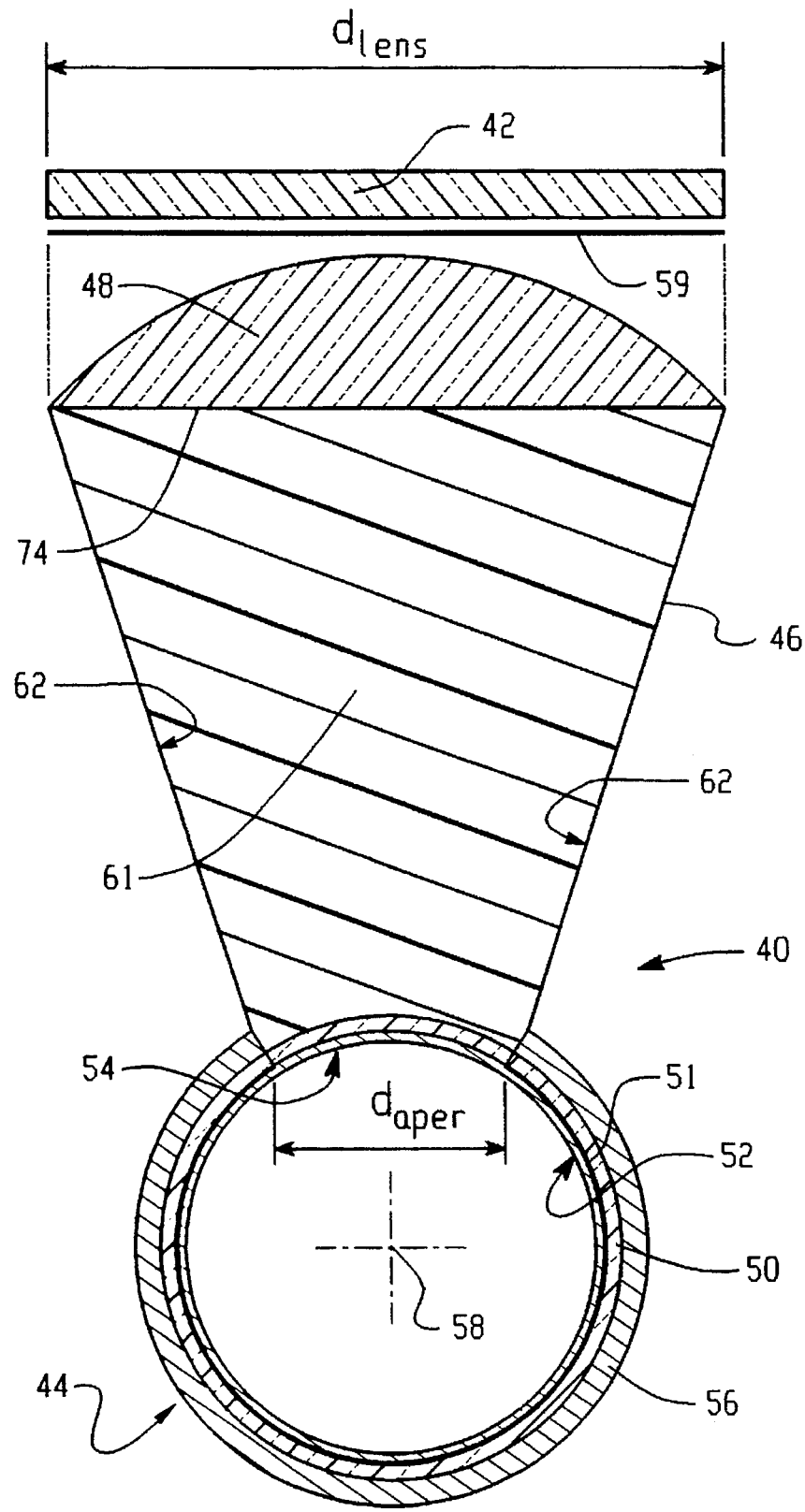
FIG. 3A is a cross sectional view of a high brightness, high efficiency illumination system constructed according to the principles of the present invention.

Referring now to the drawings, and initially to FIG. 3A, an illuminator 40 for a planar display 42 is shown constructed according to the principles of the present invention. The illuminator 40 provides even illumination for a predefined portion of the display 42. The planar display 42 is, for example, a liquid crystal display (LCD). Other illumination applications for the illuminator 40 besides a liquid crystal display include, for example, planar signs, mosaic displays, workspace illumination, vehicle interior illumination, or as a light table light source. The illuminator 40 shown in FIG. 1 is constructed having a total depth of less than one inch.

The illuminator 40 comprises a fluorescent lamp 44, a reflector 46, and an optional lens 48. The lens 48 is optional because it is contemplated that the illuminator 40 may be constructed according to the principles of the present invention, to provide even illumination for the display 42, without utilizing a separate lens 48 (see FIG. 3C). The fluorescent lamp may be either a hot-cathode or cold-cathode type of lamp, and may be of a variety of shapes, including linear (as shown in FIG. 3A), U-shaped, or serpentine in shape. In the disclosed embodiment wherein the illuminator 40 has a total depth of less than one inch, the fluorescent lamp 44 has an outer diameter of about 8 millimeter (mm).

Figure 4:
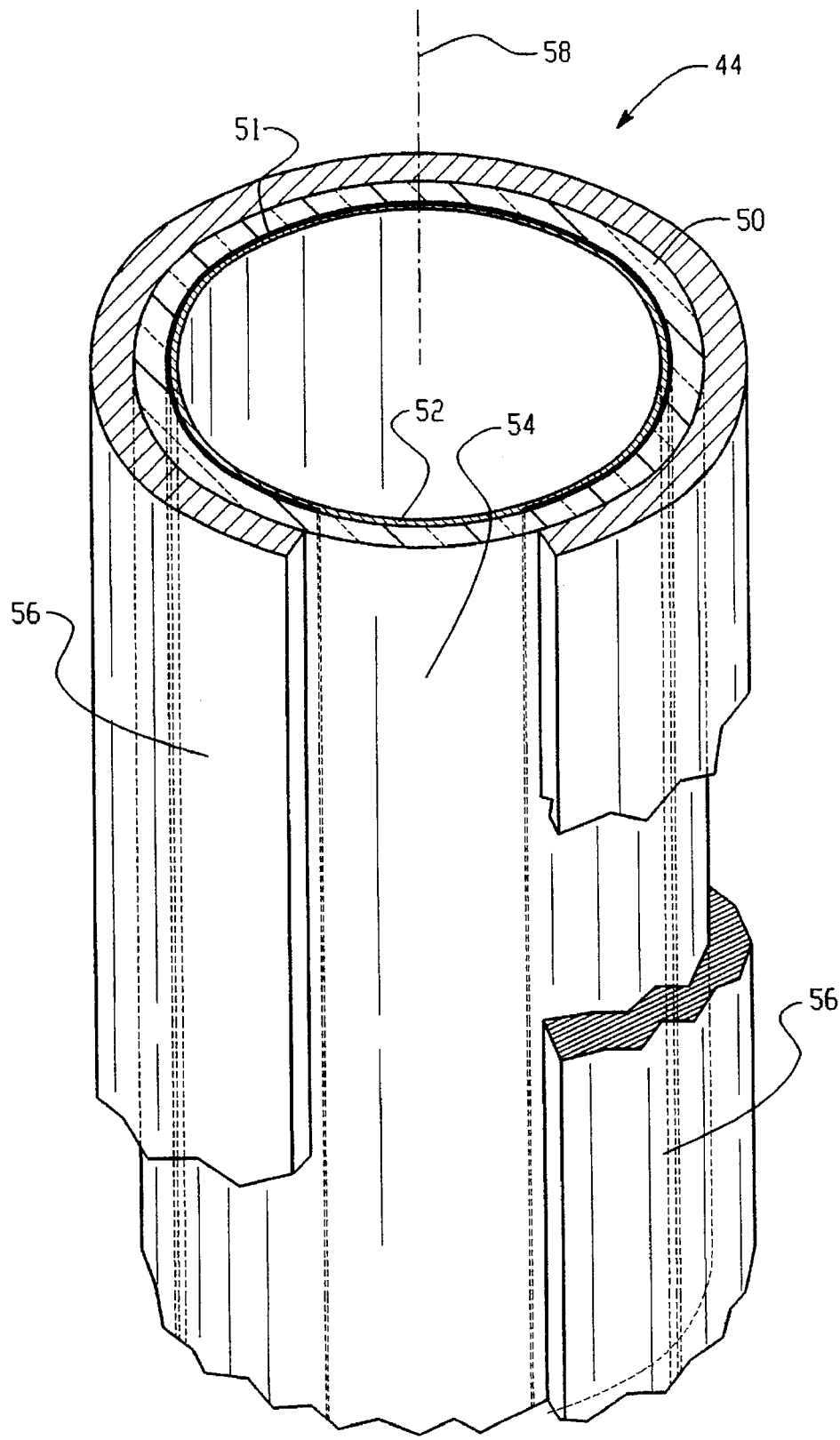
FIG. 4 is a partial perspective view of the apertured light source used in the high brightness, high efficiency illumination system of FIGS. 3A–3B.

The fluorescent lamp 44 comprises a glass tube 50 which is internally coated with a reflective material 51, such as a white titanium dioxide, except at the location of an aperture 54. A phosphor coating 52 is applied over the reflective material 51, and may or may not cover the aperture 54 (as shown in FIG. 3A, the phosphor coating is applied over the aperture). FIG. 4 shows a partial perspective view of the linear fluorescent lamp 44 shown in FIG. 3A, illustrating the aperture 54 which extends substantially along the entire length of the tube. The fluorescent lamp 44 may be built to emit any color of light for which there is an emitting phosphor. The aperture 54 permits light to be emitted by the lamp at the location of the aperture. In the case where the phosphor coating 52 is not present at the aperture, light may escape the aperture without the attenuation inherent in light passing through the phosphor 52 at locations other than the aperture.

Because the thickness of the titanium dioxide reflective coating 51 is limited in part by adhesion characteristics of the coating, light may nonetheless leak outwardly from the tube 50, if the coating of reflective material is insufficiently opaque. As such, the glass tube 50, which is internally coated with phosphor and titanium dioxide, may additionally be provided with a reflective wrap 56, which may consist of a metal foil, a layer of metallization, a layer of titanium dioxide, or reflective paper, to name a few examples. The reflective wrap may also be used in embodiments of the invention which do not include the aperture 54, wherein the entire inside surface of the tube 50 is covered with the phosphor 52 but not with the reflective material 51. In the disclosed embodiment, the reflective wrap covers the entire exterior of the tube 50 except at the location of the aperture. Thus, in the disclosed embodiment, the aperture 54 has only the phosphor coating its inner surface.

Accordingly, the reflective wrap 56 redirects light emitted through the phosphor coating back toward the interior of the lamp. In this manner, the fluorescent lamp 44 experiences a brightness gain (of about 2.5 for a 60° aperture) due to the redirected light. Using the apertured configuration of FIG. 3A, light that does not initially escape the tube 50 through the aperture 54 may eventually escape the tube after being redirected through the aperture by the reflective wrap 56.

As shown in FIGS. 3A and 4, the center of the linear fluorescent lamp 44 lies on a central longitudinal axis 58 which runs the length of the tube 50. The size of the aperture in the embodiment of FIG. 3A is defined by an angle of 60° as measured from the axis 58 of the tube and extending radially outward from the axis. Accordingly, the aperture covers a 60° arc of the total circumference of the tube 50. Such an angle has been found to provide an optimal combination of illuminator brightness and efficiency. A larger angle, for example 90°, results in only slightly better efficiency, while reducing illuminator brightness.

It has been found, for example, that as compared to the optimal 60° aperture angle, a 90° aperture angle results in only a 5% efficiency gain, while reducing the overall brightness gain of the illuminator from about 2.5 to about 2.0. The apertured and wrapped fluorescent lamp 44 has been found to output illumination on the order of 21,000 footlamberts, assuming a gain of 2.5 over an ordinary fluorescent tube averaging 8400 footlamberts of illumination. A footlambert is a unit of luminance (brightness) equal to $1/\pi$ candela per square foot.

Such initial brightness is sufficient to produce at least 15,000 footlamberts of illumination on the backside of the display 42 (13,000 footlamberts if a light diffuser 59 is employed). Assuming that only about 3.3% of the total luminance passes through the entire display, including any overlying filters, such as electromagnetic interference (EMI) filters and contrast enhancement filters, approximately 500 footlamberts of illumination are provided for the viewer observing the frontside of the display 42.

The illumination emitted by the aperture 54 is output in a lambertian distribution, meaning that the light is directed in equal brightness in all directions from the aperture. The function of the reflector 46 is to collect this emitted random light distribution, and manage the collected light by redirecting it so as to uniformly illuminate the display 42. In embodiments of the invention wherein no lens 48 is provided, the reflector 46 both collects the light output from the aperture 54 and redirects the collected light toward the display 42. However, because no lens is included in such an embodiment, the overall thickness (depth) of the illuminator 40 is increased. For embodiments which include the lens 48, the lens serves to direct the collimated light toward the viewer.

The reflector 46 is constructed from a polycarbonate or acrylic plastic material. The reflector may be formed in the shape of a solid frustum, as shown in FIG. 3A. In such a case the space 61 between the reflector walls 62 is taken up by the plastic reflector material. The lens 48, which is also constructed from a polycarbonate or acrylic plastic material, may be formed separately from the reflector 46, or unitarily formed with the reflector as a single reflector-lens element. Light emitted by the aperture 54 is directed into the reflector. If the reflector 46 is not totally internally reflective, the walls 62 may be coated with a reflective material (e.g an aluminized coating). If the reflector is totally internally reflective, however, the reflector walls 62 need not be coated.

Figure 6:
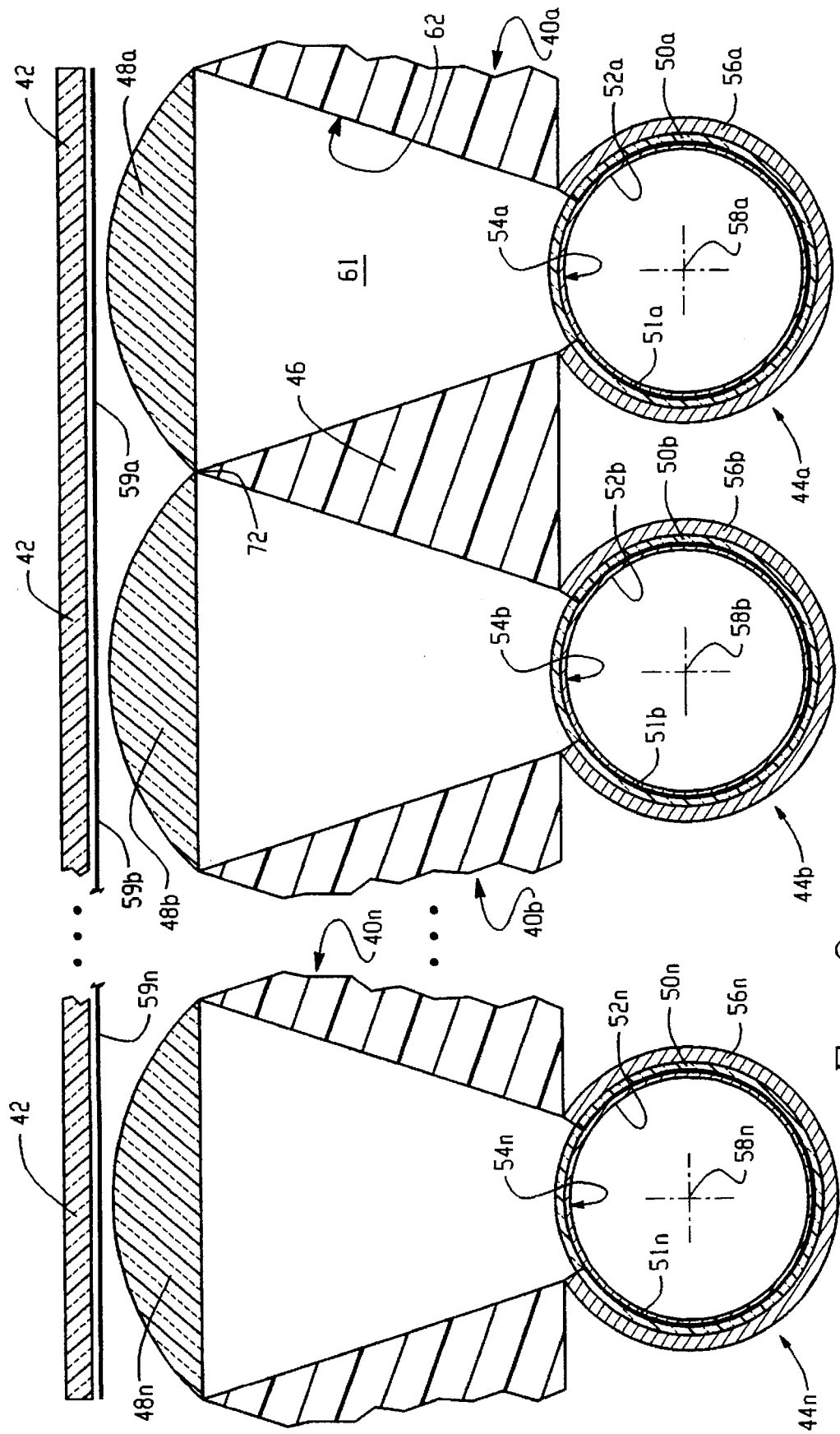
FIG. 6 is a cross sectional view of an illumination system constructed from a plurality of illuminators shown in the system of FIGS. 3A–3B.

Alternatively, the reflector 46 may be constructed so that the space 61 between the reflector walls 62 is open (air filled). As shown in FIG. 6, which shows a plurality of illuminators arranged in end-to-end relationship, the reflectors 46 are formed as pyramid-shaped elements which are disposed between the apertures 54 of adjacent illuminators 40. The lenses 48 are supported on adjacent peaks of the pyramid-shaped elements. Light emitted by the apertures 54 is reflected by opposing reflector walls 62 of adjacent reflectors, toward the lens 48. In this case, the walls 62 need to be coated with a reflective material (e.g an aluminized coating) because total internal reflection of the light emitted by the aperture 54 is not possible with such a reflector configuration.

Figure 5:
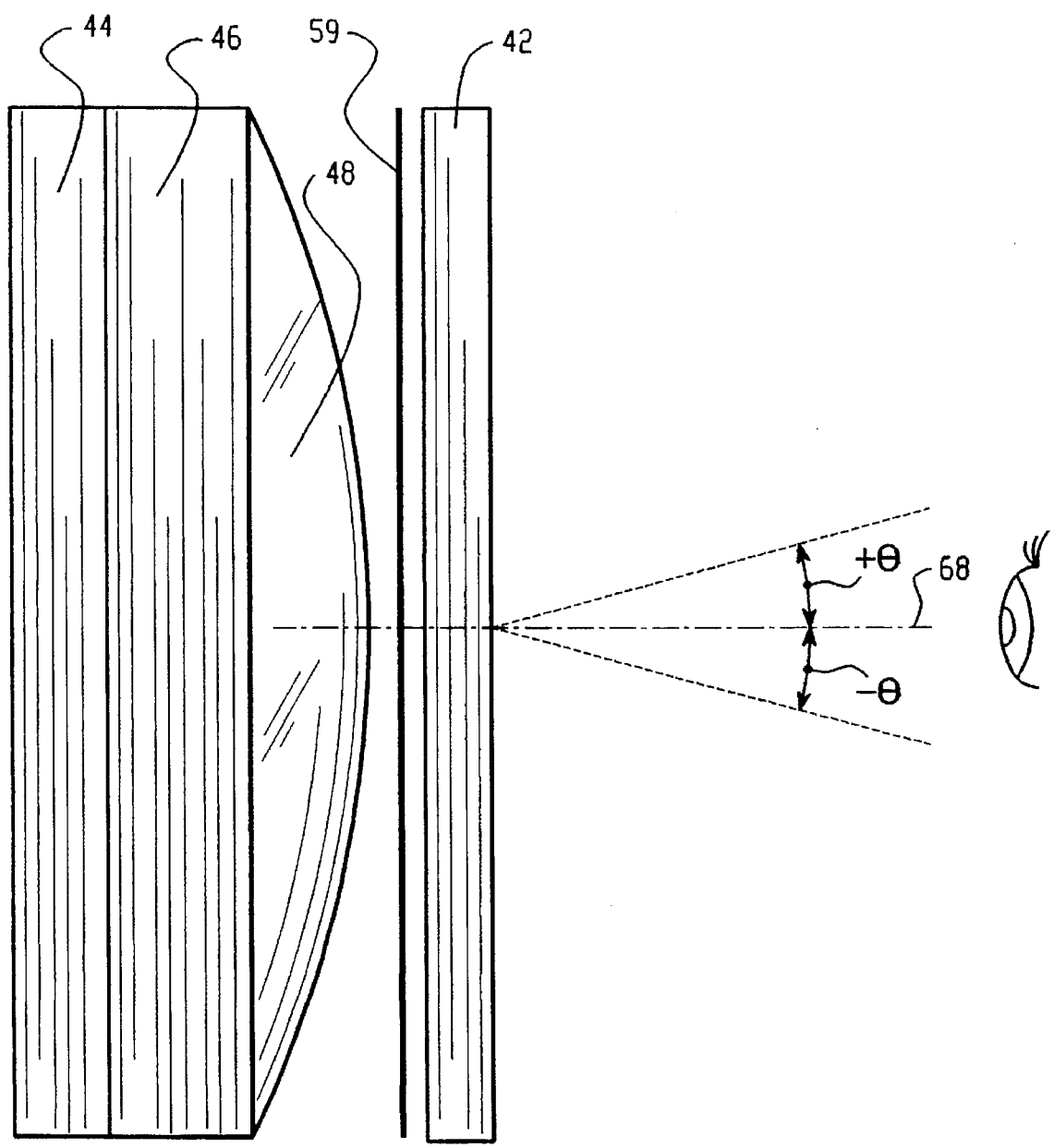
FIG. 5 is an elevational view of the illumination system of FIGS. 3A–3B.

Referring back to FIG. 3A, the degree of taper of the of the walls 62 of the reflector is determined by the width of the lens 48 ($d_{lens}$) and the width of the aperture 54 ($d_{aper}$). The width of the aperture may be determined by the diameter of the fluorescent tube 50 (e.g. 8 mm) and the aperture angle (e.g. 60°). The width of the lens (dens) is then determined based on the following formula: $d_{lens} \times \sin(\theta) = d_{aper}$, wherein $\theta$ is the viewing half angle. As shown in FIG. 5, a viewer views the display 42 along an axis 68 which lies generally perpendicular to the plane of the planar display. The lens 48 shapes the illumination impinging on its rear surface 74 in a vertical direction (from the perspective of the viewer) such that the light is emitted between the viewing angle defined by the axis 68 +/−$\theta$. In the disclosed embodiment, $\theta$ is about 15°, such that the illumination is emitted over a 30° arc. Such vertical shaping permits adequate lighting for viewers of different heights. No shaping is effected by the lens in the horizontal principal plane. Accordingly, once the diameter of the fluorescent tube and the desired viewing half angle are known, assuming an aperture angle of 60°, the designer may solve for the width of the lens ($d_{lens}$).

Figure 3B:
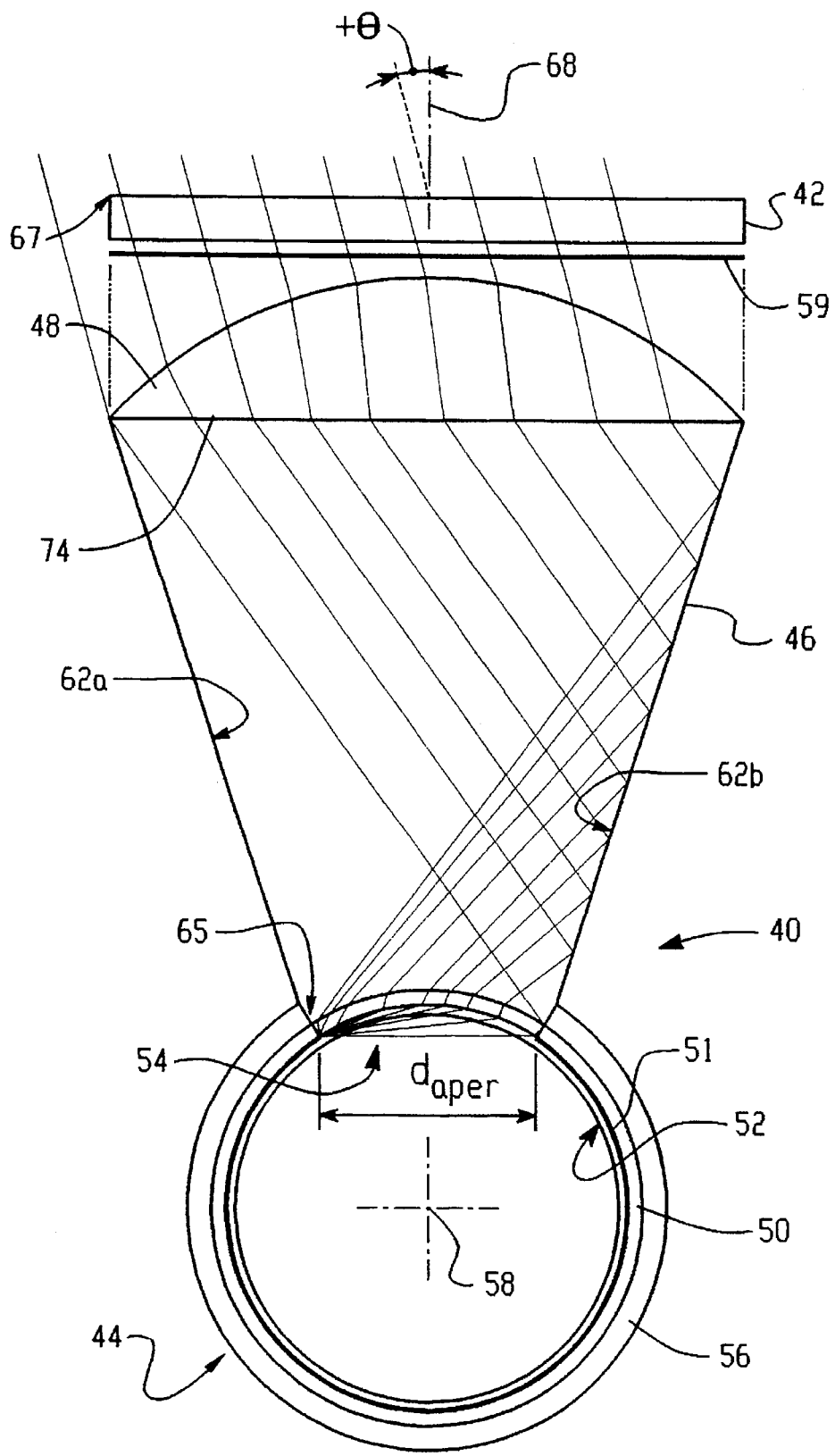
FIG. 3B is a cross sectional view of the illumination system of FIG. 3A, showing the paths of light traces emitted by an edge of an aperture thereof.
Figure 3C:
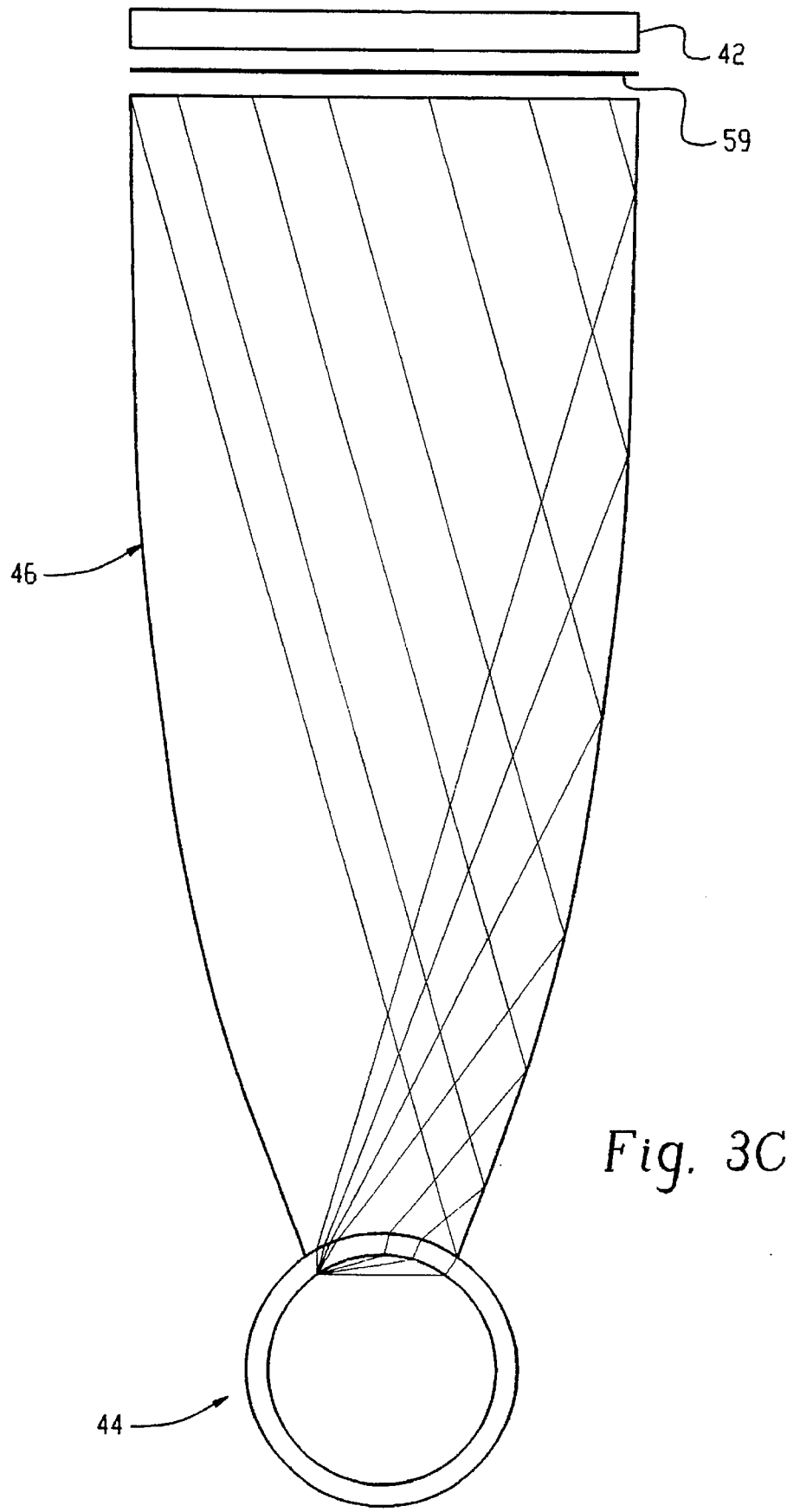
FIG. 3C is a cross sectional view of an alternative embodiment of the illumination system shown in FIGS. 3A and 3B, constructed according to the principles of the present invention.

The surface configuration of the tapered walls 62 of the reflector, which determines the manner in which light is initially directed toward the lens 48, and ultimately toward the viewer, is determined by a ray tracing method. As shown in FIG. 3B, all of the light rays which emanate from the leftmost point 65 of the aperture, and which are emitted in a lambertian distribution, are traced from this leftmost point, off of the reflector wall 62b, through the lens 48 as they impinge upon the generally flat (in this embodiment) rear surface 74 thereof, and finally through the light (not heavy) diffuser 59 and the display 42. As explained above, the desired viewing half angle $\theta$ determines the width of the lens ($d_{lens}$). Thus, the leftmost point 67 of the display 42 will define the extreme viewing angle (+$\theta$) of the light emanating from the side of the display facing the viewer.

Similarly, ray paths are traced from the rightmost point of the aperture 54 to complete the determination of the surface configuration of the tapered walls 62 of the reflector. In this manner, the rightmost point of the display 42 can be used to define the extreme viewing angle (−$\theta$) of the light emanating from the side of the display facing the viewer. Once these leftmost and rightmost points of the display are determined, all of the light which emanates from the aperture 54 between the aperture leftmost and rightmost points automatically falls within the viewing angle defined by the axis 68 +/−$\theta$. For most applications, the viewing angle will be limited in the vertical direction from the perspective of a viewer. Accordingly, light emitted from the leftmost point 65 of the aperture 54 defines the upper extreme viewing angle through the lens from the perspective of a viewer, and the light emitted from the rightmost point of the aperture defines the lower extreme viewing angle through the lens.

As shown in FIGS. 3A and 3B, the walls 62 of the reflector are substantially linear. This linear design of the reflector is made possible by the presence of the lens 48. Such a configuration insures that all of the light emitted by the aperture 54 is reflected by the reflector toward the lens.

Because the reflector is designed to provide substantially uniform illumination, the need for a heavy diffuser is eliminated. In addition, the lens reduces the depth of the device. As explained above, in embodiments of the invention wherein no lens is included, the overall thickness (depth) of the illuminator 40 is increased (see FIG. 3C).

In addition to the shape of lens shown in FIGS. 3A–3B (generally spherical), it is contemplated that other shapes of lenses may be utilized, including a Fresnel lens. In the case of a Fresnel lens, which is a relatively thin, faceted lens having a non-continuous surface, the overall thickness of the system may be further reduced due to a reduction in depth of the lens itself.

FIG. 6 shows a system 70 comprising a plurality of illuminators 40a, 40b, through 40n, connected in end-to-end relationship. The illuminators 40a–40n are constructed as described above in connection with FIG. 3A. In this embodiment, the display 42 extends over each of the illuminators 40a–40n. In addition, the illuminators 40 may also be connected side-to-side to form a two dimensional X-Y matrix of illuminators. In this manner, the illumination system 70 may be adapted for illuminating a variety of sizes of displays, from a few square inches in area, to several square feet, without experiencing any increase in depth.

Because the reflectors 46 and the lenses 48a–n only illuminate the portion of the display directly overlying them, the adjacently positioned illuminators 40a–40n in the system provide uniform illumination for the entire display 42, without creating any unwanted overlapping illumination. In addition, because the lenses 48 adjacently abut one another at a point 72 (see, for example, the interface between lens 48a and 48b), the resulting seamless juxtaposition of lenses in the system 70 minimizes any unwanted absence of light at the lens-to-lens interfaces.

The lenses 48a–48n may be constructed individually or they may be combined into a single unitary lens underlying the entire display 42 to be illuminated. In addition, as explained above, the reflectors 46 may be constructed individually or as multi-reflector units. For example, as shown in FIG. 6, the pyramid-shaped element 46 may be used to construct the portion of the reflector extending from the leftmost point of aperture 54a and the portion of the reflector extending from the rightmost point of aperture 54b. Alternatively, if the reflectors are constructed as individual units for each illuminator 40, and not as the multi-reflector units shown in FIG. 6, the reflectors may be combined with the lenses 48 as a unitary part using an optical plastic, acrylic or glass with a sufficiently high index of refraction to achieve total internal reflection at the reflective surfaces 62.

Accordingly, the preferred embodiment of apertured fluorescent illumination device for backlighting an image plane has been described. With the foregoing description in mind, however, it is understood that this description is made only by way of example, that the invention is not limited to the particular embodiments described herein, and that various rearrangements, modifications and substitutions may be implemented without departing from the true scope of the invention as hereinafter defined by the following claims and their equivalents.

I claim:

1. An illuminated display system, comprising:
   a generally planar display;
   a fluorescent lamp underlying said generally planar display, said fluorescent lamp having an interior surface thereof substantially coated with a phosphor and an aperture for emitting illumination toward said planar display;
   a reflector for collecting said emitted illumination and reflecting said collected illumination toward said planar display, said reflector being positioned intermediate said fluorescent lamp and said display; and
   a lens for receiving said illumination reflected by said reflector, and for aiming said received illumination toward a viewer of said display, said lens being positioned between said reflector and said display;
   wherein said reflector comprises two generally planar elements, each of said generally planar elements extending from a respective end of said aperture to said lens, and wherein the width of said lens ($d_{lens}$) is determined by the formula: $d_{lens} \times \sin(\theta) = d_{aper}$, wherein $d_{aper}$ is the width of said aperture and $\theta$ is the viewing half angle of light emanated by the display.

2. The illuminated display system of claim 1, wherein said fluorescent lamp is provided with a reflective coating between said interior surface thereof and said phosphor coating, said reflective coating overlying a substantial portion of said interior surface except at the location of said aperture.

3. The illuminated display system of claim 1, wherein said reflective coating is titanium dioxide.

4. The illuminated display system of claim 1, wherein said fluorescent lamp is provided with a reflective wrap for increasing the illumination gain thereof.

5. The illuminated display system of claim 1, wherein said aperture is defined by an angle of 60° as measured from a generally central longitudinal axis extending the length of the fluorescent lamp.

6. The illuminated display system of said 1, wherein said lens has a generally flat surface facing said reflector and a generally spherical surface facing said display.

7. The illuminated display system of claim 1, further comprising a light diffuser positioned between said lens and said display.

8. The illuminated display system of claim 1, wherein said reflector is coated with a reflective material.

9. The illuminated display system of claim 1, wherein said lens shapes said redirected illumination in one of two dimensions of said planar display.

10. A backlighting unit for illuminating a generally planar display, comprising:
    a fluorescent lamp underlying the generally planar display, said fluorescent lamp having an interior surface thereof substantially coated with a phosphor and an aperture for emitting illumination toward the planar display;
    a reflector for collecting said emitted illumination and reflecting said collected illumination toward said planar display, said reflector being positioned intermediate said fluorescent lamp and said display; and
    a lens for receiving said illumination reflected by said reflector, and for aiming said received illumination toward said display, said lens being positioned between said reflector and said display;
    wherein said reflector comprises two generally planar elements, each of said planar elements extending from a respective end of said aperture to said lens, and wherein the width of said lens (den) is determined by the formula: $d_{lens} \times \sin(\theta) = d_{aper}$, wherein $d_{aper}$ is the width of said aperture and $\theta$ is the viewing half angle of light emanated by the display.

11. The backlighting unit of claim 10, wherein said fluorescent lamp is provided with a reflective coating between said interior surface thereof and said phosphor coating, said reflective coating overlying a substantial portion of said interior surface except at the location of said aperture.

12. The backlighting unit of claim 10, wherein said reflective coating is titanium dioxide.

13. The backlighting unit of claim 10, wherein said fluorescent lamp is provided with a reflective wrap for increasing the illumination gain thereof.

14. The backlighting unit of claim 13, wherein said aperture is defined by an angle of 60° as measured from a generally central longitudinal axis extending the length of the fluorescent lamp.

15. The backlighting unit of said 14, wherein said lens has a generally flat surface facing said reflector and a generally spherical surface facing the display.

16. The backlighting unit of claim 14, further comprising a light diffuser positioned on a side of said lens opposite said reflector.

17. The backlighting unit of claim 14, wherein said lens is provided with a surface for shaping said illumination reflected by said reflector in one of two dimensions of said planar display.

18. A backlighting unit for illuminating a generally planar display, comprising:
    a fluorescent lamp underlying the generally planar display, said fluorescent lamp having an interior surface thereof substantially coated with a phosphor and an aperture for emitting illumination toward the planar display, said fluorescent lamp being provided with a reflective wrap for increasing the illumination gain thereof;
    a reflector for collecting said emitted illumination and reflecting said collected illumination toward said planar display, said reflector being positioned intermediate said fluorescent lamp and said display; and
    a lens for receiving said illumination reflected by said reflector, and for aiming said received illumination toward said display, said lens being positioned between said reflector and said display;
    wherein said backlighting unit has a total depth of less than one inch, and wherein said fluorescent lamp outputs at least 21,000 footlamberts of illumination from said aperture.

19. A backlighting system for a generally planar display, comprising:

a plurality of fluorescent lamps each having an interior surface thereof substantially coated with a phosphor and an aperture for emitting illumination toward the generally planar display; and a corresponding plurality of reflectors for collecting said emitted illumination and reflecting said collected illumination toward the planar display, said reflectors being positioned intermediate said fluorescent lamps and the display, each of the plurality of reflectors being positioned adjacent to one another.

20. The backlighting system of claim 19, further comprising a corresponding plurality of lenses for receiving said illumination reflected by said reflectors, and for redirecting said received illumination toward the display, said lenses being positioned between said reflectors and the display, each of said lenses being positionable adjacent to one another at a point to minimize interference between adjacent lenses.

21. The backlighting system of claim 20, wherein each of said reflectors comprises two generally planar elements, each of said planar elements extending from a respective end of an aperture of a corresponding illumination source to a corresponding lens.

22. The backlighting system of claim 20, wherein said backlighting system has a total depth of less than one inch, and wherein each of said fluorescent lamps outputs at least 21,000 footlamberts of illumination from said aperture.

23. The backlighting system of claim 22, wherein either or both of said plurality of lenses and said plurality of reflectors are constructed as a unitary element.

* * * * *